May 9, 1939.   J. H. WILLIAMS, JR   2,157,644
TENTER MACHINE
Original Filed May 6, 1938
Fig.1.
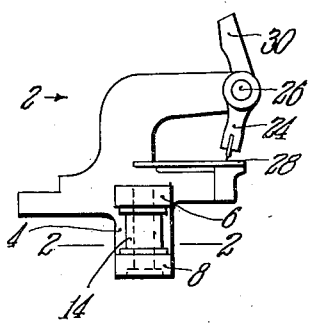
Fig.4.
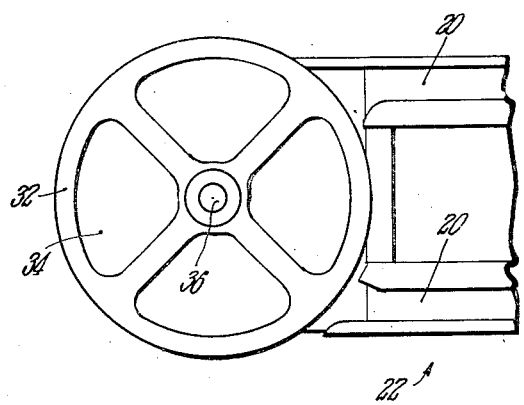
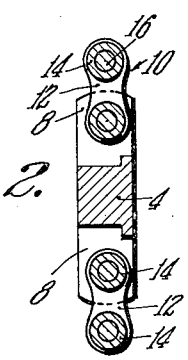
Fig.2.
Fig.3.
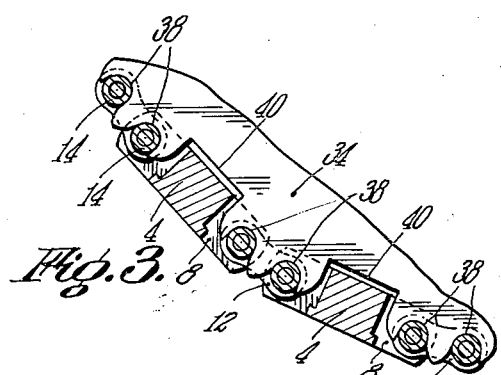
INVENTOR.
John H. Williams, Jr.
BY
Walter C. Ross
ATTORNEY.

Patented May 9, 1939

2,157,644

UNITED STATES PATENT OFFICE 2,157,644

TENTER MACHINE

John H. Williams, Jr., Providence, R. I.

Original application May 6, 1938, Serial No. 206,445. Divided and this application September 13, 1938, Serial No. 229,715

2 Claims. (Cl. 26—61)

This invention relates to improvements in tenter machines and is directed more particularly to improvements in tenter chains, clips and driving sprockets for the same. This application is a division of a copending application Serial No. 206,445 filed by me on May 6, 1938 which issued as Patent 2,147,115 on February 14, 1939.

According to the novel features of this invention a tenter clip for a chain and a sprocket of novel form are provided to facilitate quietness and smoothness in the operation of the chain and sprocket. The invention also facilitates the employment of a larger sprocket than is possible with prior art sprockets. Large sprockets are desirable for many reasons among which are smoothness and efficiency in operation as well as the attainment of high speed operation.

Numerous other objects and advantages of the invention will be hereinafter more fully referred to in connection with the accompanying description of the present preferred form of the invention, reference being had to the drawing, wherein:

Fig. 1 is a side elevational view of a tenter clip embodying the novel features of the invention;

Fig. 2 is a sectional plan view on the line 2—2 of Fig. 1;

Fig. 3 is an enlarged plan view of the peripheral portion of a sprocket having a tenter chain composed of the clips shown in Figs. 1 and 2 associated therewith; and Fig. 4 is a small scale plan view of a tenter machine rail.

Referring now to the drawing more in detail the invention will be fully described.

A tenter clip of the invention represented by 2 in Figs. 1 and 2 includes a body portion 4 from each end of which extends upper and lower lugs or ears 6 and 8. The lugs at adjacent ends of adjacent clips are connected together by links indicated generally by 10 to form a tenter chain. The links 10 preferably include upper and lower plates such as 12 between which are bushings or rollers 14 and pivot pins 16 extend through the lugs 8, plates 12 and bushings 14, as shown.

The body portion 4 of the clip is preferably arranged so that when the clips are pivotally connected together to form a chain the said clips slide in guides such as 20 of a rail indicated generally by 22.

A gate 24 is pivoted at 26 to the clip which cooperates with a plate 28 to clamp material therebetween. A tail piece 30 extending upwardly from the gate is arranged to be engaged by an opener such as 32 which is disposed immediately above a sprocket 34 that is rotated by shaft 36.

The sprocket 34 is provided with sockets 38 arranged in pairs and recesses 40 disposed between the pairs of sockets. The sockets 38 are arranged to operatively receive the bushings 14 while the recesses 38 are arranged to loosely receive the body parts 4 of the clips.

The bushings 14 are machined to size within narrow limits and the sockets 38 are accurately formed and spaced. The bushings of the chain are received in the said socket while the body portions 4 are received in but not in engagement with the recesses 40. By means of the construction since the bushings are the only parts contacting with the sprockets, smoothness and quietness of operation are assured while the speed of operation is not reduced because of any irregularities of engaging parts.

While I have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

1. A tenter chain and sprocket construction comprising in combination, a plurality of tenter clips having central body portions and spaced upper and lower lugs at opposite sides thereof, a plurality of links each having a pair of upper and lower plates with the opposite ends of said plates disposed between the upper and lower adjacent lugs of adjacent clips, bushings between said plates at opposite ends thereof, pins extending through said lugs, ends of said plates and bushings to connect the links to the clips, and a sprocket having teeth each of which includes a part for entering between the bushings of the links and recesses at the sides thereof for receiving the bushings of the links and recesses between the teeth for loosely receiving the bodies of the clips whereby the bodies of the clips are closely related to the pitch line of the sprocket.

2. A tenter chain and sprocket construction comprising in combination, a plurality of tenter clips having central body portions and lugs at opposite sides thereof, links between the lugs of adjacent clips, pivotal connections between opposite ends of said links and adjacent lugs of adjacent clips whereby alternate clips and links are pivotally connected to form a tenter chain, a sprocket having spaced tooth parts each formed with a tooth part for entering between adjacent pivotal connections at the adjacent sides of adjacent clips and recesses at either side of the said tooth part for receiving said pivotal connections and provided with body recesses for loosely receiving the bodies of the clips, all adapted and arranged whereby the clips have separate pivotal connections at opposite sides thereof and at adjacent sides of adjacent clips receivable in adjacent recesses with the tooth parts of the sprocket between said recesses disposed between adjacent pivotal connections at adjacent sides of adjacent clips and the bodies of the clips disposed in said body recesses.

JOHN H. WILLIAMS, Jr.